(12) United States Patent
Cheng et al.

(10) Patent No.: US 11,764,716 B1
(45) Date of Patent: Sep. 19, 2023

(54) DETERMINATION OF OPERATION MODE FOR AC ASYNCHRONOUS THREE-PHRASE MOTOR IN ESCALATOR SYSTEM

(71) Applicant: Otis Elevator Company, Farmington, CT (US)

(72) Inventors: Lifei Cheng, Hangzhou (CN); Zhaoxia Hu, Hangzhou (CN); Xinwei Gong, Haining (CN); Wentong Liu, Hangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/988,456

(22) Filed: Nov. 16, 2022

(30) Foreign Application Priority Data

Apr. 1, 2022 (CN) .......................... 202210339071.9

(51) Int. Cl.
*H02P 23/08* (2006.01)
*H02P 25/18* (2006.01)
*B66B 25/00* (2006.01)

(52) U.S. Cl.
CPC .............. *H02P 23/08* (2013.01); *B66B 25/00* (2013.01); *H02P 25/184* (2013.01); *H02P 2207/01* (2013.01)

(58) Field of Classification Search
CPC .... H02P 23/08; H02P 25/184; H02P 2207/01; B66B 25/00
See application file for complete search history.

(56) References Cited

U.S. PATENT DOCUMENTS

| | | | |
|---|---|---|---|
| 2001/0002644 A1* | 6/2001 | Haruta ..................... | B66B 25/00 198/326 |
| 2012/0116574 A1* | 5/2012 | Kangas ................... | B66B 25/00 700/230 |
| 2017/0305723 A1* | 10/2017 | Wang ..................... | B66B 29/005 |

* cited by examiner

Primary Examiner — Zoheb S Imtiaz
(74) Attorney, Agent, or Firm — CANTOR COLBURN LLP (57) ABSTRACT

A device and method for determining operating modes of an AC asynchronous three-phase motor in an escalator system and computer-readable storage medium on which a computer program for implementing the method is stored. The operating modes include a first operating mode and a second operating mode, the AC asynchronous three-phase motor adopts a triangular wiring mode and a star wiring mode in the first operating mode and the second operating mode, respectively, the device includes: a memory; a processor coupled with the memory; and a computer program stored on the memory and running on the processor, the running of the computer program causes: A. obtaining a slip rate of the AC asynchronous three-phase motor; and B. determining whether the AC asynchronous three-phase motor needs to be switched between the first operating mode and the second operating mode based on the slip rate.

22 Claims, 5 Drawing Sheets

DETERMINATION OF OPERATION MODE FOR AC ASYNCHRONOUS THREE-PHRASE MOTOR IN ESCALATOR SYSTEM

FOREIGN PRIORITY

This application claims priority to Chinese Patent Application No. 202210339071.9, filed Apr. 1, 2022, and all the benefits accruing therefrom under 35 U.S.C. § 119, the contents of which in its entirety are herein incorporated by reference.

TECHNICAL FIELD

The present application relates to elevator technology, in particular to a device and method for determining operating modes of an AC asynchronous three-phase motor in an escalator system and computer-readable storage medium on which a computer program for implementing the method is stored.

BACKGROUND

The importance of environment to human development is self-evident, and countries all over the world are taking active and effective measures to improve the environment and reduce pollution, of which energy saving is the key and most direct and effective way. For escalators, in addition to using inverters, other means of energy saving include using different motor connections at different loads. However, what troubles the industry at present is that the control logic that determines the motor connection based on the load cannot meet requirements in terms of control accuracy, and thus cannot achieve the expected energy saving effect.

SUMMARY

According to an aspect of the present application, there is provided a device for determining operating modes of an AC asynchronous three-phase motor in an escalator system, wherein the operating modes comprise a first operating mode and a second operating mode, wherein the AC asynchronous three-phase motor adopts a triangular wiring mode and a star wiring mode in the first operating mode and the second operating mode, respectively, the device comprising: a memory; a processor coupled with the memory; and a computer program stored on the memory and running on the processor, the running of the computer program causes: A. obtaining a slip rate of the AC asynchronous three-phase motor; and B. determining whether the AC asynchronous three-phase motor needs to be switched between the first operating mode and the second operating mode based on the slip rate.

Optionally, the device is an escalator controller or a computing device independent of the escalator controller.

In the above device, the running of the computer program further causes: C. generating a control command to cause the AC asynchronous three-phase motor to operate in the determined operating mode.

In addition to one or more of the above features, in the above device, the running of the computer program causes operation A to be performed in the following manner A1. obtaining a measured value of a rotational speed of the AC asynchronous three-phase motor; A2. determining the slip rate by the following equation:

$$S = \frac{n_1 - n}{n_1}$$

Here, $n_1$ is a rotating magnetic field speed of the AC asynchronous three-phase motor, and n is the measured value of the rotational speed of the AC asynchronous three-phase motor.

In addition to one or more of the above features, in the above device, the running of the computer program causes operation B to be performed in the following manner B1. when the AC asynchronous three-phase motor operates in the first operating mode, determining that a current operating mode continues to be the first operating mode if the slip rate is greater than or equal to a first threshold, otherwise switching the current operating mode to the second operating mode; B2. when the AC asynchronous three-phase motor operates in the second operating mode, determining that the current operating mode continues to be the second operating mode if the slip rate is less than or equal to a second threshold, otherwise switching the current operating mode to the first operating mode.

Optionally, in the above device, the first threshold is greater than, equal to or less than the second threshold.

Optionally, in the above device, the first threshold is taken in a range of −0.036 to 0.036 and the second threshold is taken in a range of −0.048 to 0.048.

According to another aspect of the present application, there is provided an escalator system comprising: an escalator; an AC asynchronous three-phase motor for driving the escalator adapted to operate in a first operating mode and a second operating mode, wherein the AC asynchronous three-phase motor adopts a triangular wiring mode and a star wiring mode in the first operating mode and the second operating mode, respectively; an escalator controller, comprising: a memory; a processor coupled with the memory; and a computer program stored on the memory and running on the processor, the running of the computer program causes: A. obtaining a slip rate of the AC asynchronous three-phase motor; and B. determining whether the AC asynchronous three-phase motor needs to be switched between the first operating mode and the second operating mode based on the slip rate.

Optionally, in the above escalator system, the escalator system further comprises a measuring unit configured to measure a rotational speed of the AC asynchronous three-phase motor and output the measured value to the escalator controller.

According to another aspect of the present application, there is provided a method for determining operating modes of an AC asynchronous three-phase motor in an escalator system, wherein the operating modes comprise a first operating mode and a second operating mode, the AC asynchronous three-phase motor adopts a triangular wiring mode and a star wiring mode in the first operating mode and the second operating mode, respectively, the method comprising: A. obtaining a slip rate of the AC asynchronous three-phase motor; and B. determining whether the AC asynchronous three-phase motor needs to be switched between the first operating mode and the second operating mode based on the slip rate.

According to another aspect of the present application, there is provided a computer-readable storage medium on which a computer program suitable for running on a processor of a terminal device is stored, the running of the computer program causes steps of the method as described above to be performed.

DESCRIPTION OF THE DRAWINGS

The above and/or other aspects and advantages of the present application will be clearer and more easily understood from the following description of various aspects in conjunction with the accompanying drawings, in which the same or similar elements are denoted by the same reference numerals. The accompanying drawings include.

DETAILED DESCRIPTION

The present application is described more fully below with reference to the accompanying drawings, in which illustrative embodiments of the application are illustrated. However, the present application may be implemented in different forms and should not be construed as limited to the embodiments presented herein. The presented embodiments are intended to make the disclosure herein comprehensive and complete, so as to more comprehensively convey the protection scope of the application to those skilled in the art.

In this specification, terms such as "comprising" and "including" mean that in addition to units and steps that are directly and clearly stated in the specification and claims, the technical solution of the application does not exclude the presence of other units and steps that are not directly and clearly stated in the specification and claims.

Unless otherwise specified, terms such as "first" and "second" do not indicate the order of the units in terms of time, space, size, etc., but are merely used to distinguish the units. In this specification, "escalator" refers to a means of transportation that carries pedestrians by means of a transport belt, including, for example, automatic escalators and automatic walkways.

AC asynchronous three-phase motors usually can adopt two wiring modes, namely triangular wiring mode and star wiring mode. In the following description, an operating mode of the AC asynchronous three-phase motor corresponding to the triangular wiring mode is referred to as a Δ-mode or a first operating mode, and an operating mode of the AC asynchronous three-phase motor corresponding to the star wiring mode is referred to as a Y-mode or a second operating mode.

The inventors of the application have found, after research, that a suitable operating mode can be selected based on the motor's slip rate, making it possible to operate the AC asynchronous three-phase motor in an operating mode with lower energy consumption (e.g., Y-mode) as much as possible while meeting the load demand. The slip rate-based approach represents a more rational control logic than the one that determines a current load state of the escalator based on the number of passengers it carries and dynamically switches between the two operating modes based on the load state, since it is sometimes inappropriate to determine the load state only based on the number of passengers (e.g., when the escalator still carries cargo). In addition, the slip rate-based approach is cheaper to implement and improves reliability since it is not necessary to introduce an expensive image processing device with a risk of misidentification to count passengers.

Figure 1:
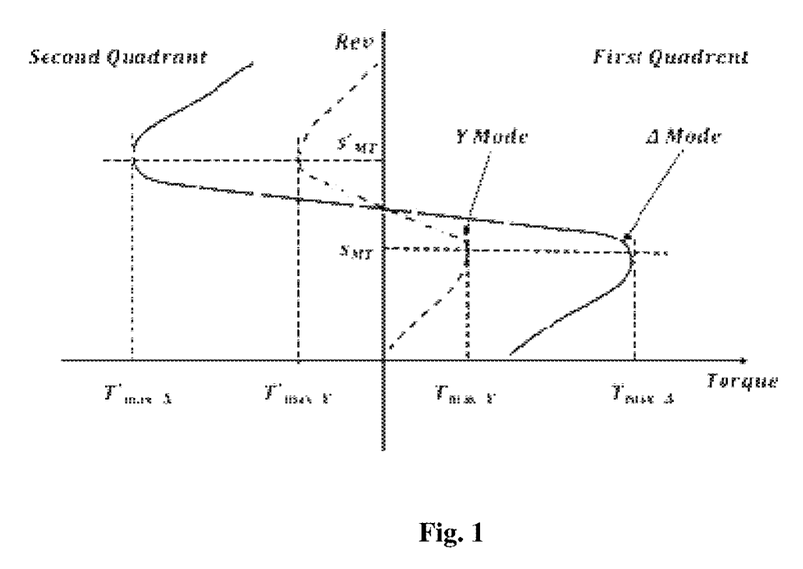
FIG. 1 shows a schematic relationship curve between rotational speed and output torque for an AC asynchronous three-phase motor.

FIG. 1 shows a schematic relationship curve between rotational speed and output torque for an AC asynchronous three-phase motor, where a vertical axis represents the rotational speed Rev of the motor (e.g., in cycles per minute) and a horizontal axis represents the output torque T of the motor (e.g., in Newton. meter). In FIG. 1, the solid line represents the relationship curve between rotational speed and output torque for the AC asynchronous three-phase motor with the triangular wiring mode, and the dashed line represents the relationship curve between rotational speed and output torque for the AC asynchronous three-phase motor with the star wiring mode. It can be seen from the relationship curve shown in FIG. 1 that in a first quadrant (which corresponds to an upward movement of the escalator, for example), the output torque increases as the rotational speed of the motor decreases, and when the rotational speed of the motor decreases to a critical value (identified by SMT in FIG. 1), the output torque reaches a maximum value (identified by $T_{max\_y}$ and $T_{max\_\Delta}$ in FIG. 1), and then the output torque decreases as the rotational speed of the motor decreases. On the other hand, in a second quadrant (which corresponds to an downward movement of the escalator, for example), the output torque (absolute value) increases as the rotational speed of the motor increases, and when the rotational speed of the motor increases to a critical value (identified by S'MT in FIG. 1), the output torque reaches a maximum value (identified by $T'_{max\_y}$ and $T'_{max\_\Delta}$ in FIG. 1), and then the output torque (absolute value) decreases as the rotational speed of the motor increases.

As shown in FIG. 1, in the Y-mode, when the rotational speed of the motor does not exceed the critical value (i.e., when it lies within a range of $(S_{mT}, S'_{mT})$), its relationship with the output torque is essentially linear, and also for the Δ-mode. However, in both modes, slope of the linear relationship between the rotational speed of the motor and the output torque is different, i.e., the slope in the Y-mode is greater than that in the Δ-mode.

In some embodiments of the present application, for the difference of the relationship between the rotational speed of the motor and output torque of the AC asynchronous three-phase motor in different modes, corresponding thresholds can be set for Y-mode to Δ-mode switching (hereinafter also referred to as Y-Δ switching) and Δ-mode to Y-mode switching (hereinafter also referred to as Δ-Y switching) respectively for use in the operating mode selection logic based on the slip rate.

In one example, the thresholds for Y-Δ switching and Δ-Y switching are set to a first threshold $TH_1$ and a second threshold $TH_2$, respectively, and the judgment logic for each switching is performed independently based on the respective switching thresholds. For example, when the AC asynchronous three-phase motor is currently operating in the Δ-mode, if the slip rate is greater than or equal to the first threshold TH1, the current operating mode is determined to remain in the Δ-mode, and if the slip rate is less than the first threshold $TH_1$, the current operating mode is determined to switch from the Δ-mode to the Y-mode. For another example, when the AC asynchronous three-phase motor is currently operating in the Y-mode, if the slip rate is less than or equal to the second threshold $TH_2$, the current operating mode is determined to remain in the Y-mode, and if the slip rate is greater than the second threshold $TH_2$, the current operating mode is determined to switch from the Y-mode to the Δ-mode.

It should be noted that the relative relationship between the first and second thresholds varies depending on the specific application (e.g., depending on the characteristics of the AC asynchronous three-phase motor and the characteristics of the application, etc.). That is, the first threshold may be greater than, equal to, or less than the second threshold.

Optionally, the first threshold is taken in the range TH1ε{−0.036,0.036} and the second threshold is taken in the range TH2ε{−0.048,0.048}.

Figure 2:
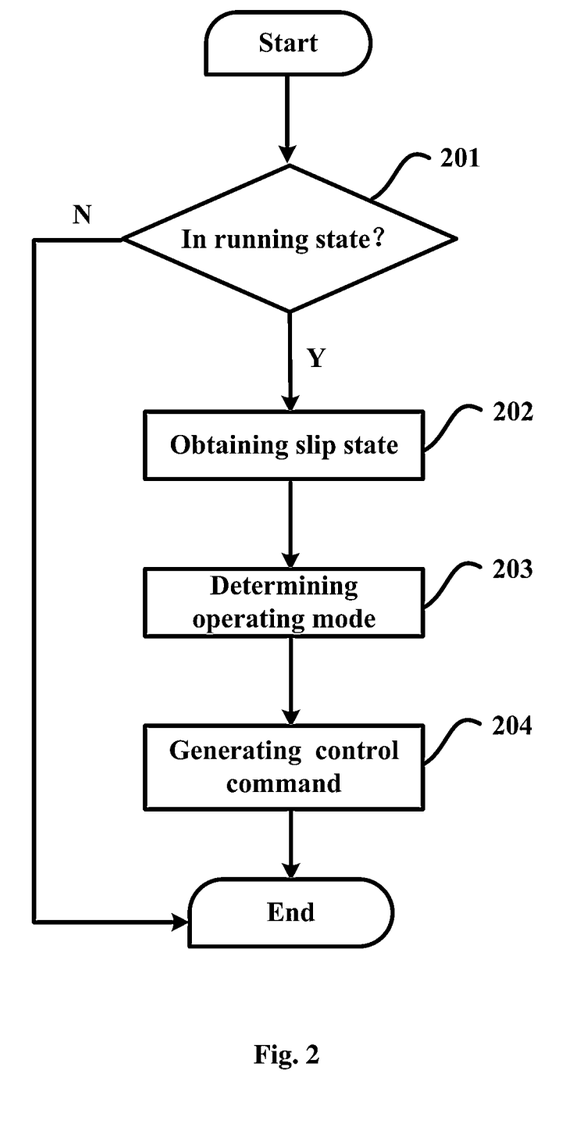
FIG. 2 is a flowchart of a method for determining operating modes of an AC asynchronous three-phase motor in an escalator system in accordance with some embodiments of the present application.

FIG. 2 is a flowchart of a method for determining operating modes of an AC asynchronous three-phase motor in an escalator system in accordance with some embodiments of the present application. Exemplarily, the operating modes may include a first operating mode (A-mode) and a second operating mode (Y-mode). The method described below may be implemented by various devices that include, for example, but are not limited to, an escalator controller and a computing device independent of the escalator controller, etc.

Referring to FIG. 2, at step 201, the escalator controller or computing device determines whether the AC asynchronous three-phase motor is in a running state. If it is in the running state, proceed to step 202, otherwise end the method flow shown in FIG. 2.

Figure 3:
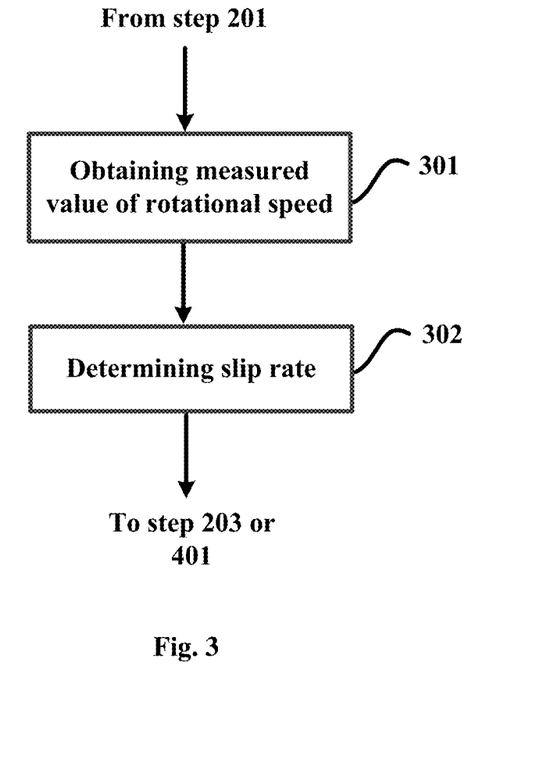
FIG. 3 is a flowchart of a method for obtaining a slip rate of an AC asynchronous three-phase motor in accordance with some embodiments of the present application.

In step 202, the escalator controller or computing device obtains a slip rate of the motor. Exemplarily, a method shown in FIG. 3 may be utilized to obtain the slip rate. Specifically, the method shown in FIG. 3 includes the following steps:

Step 301: obtaining a measured value of the rotational speed of the AC asynchronous three-phase motor. Exemplarily, the escalator controller or computing device may receive the measured value of the rotational speed of the AC asynchronous three-phase motor from a measuring unit.

Step 302: determining the slip rate by the following equation:

$$S = \frac{n_1 - n}{n_1} \qquad (1)$$

Here, $n_1$ is a rotating magnetic field speed of the AC asynchronous three-phase motor, and n is the measured value of the rotational speed of the AC asynchronous three-phase motor.

After performing step 202, the method flow shown in FIG. 2 proceeds to step 203. In this step, the escalator controller or computing device may determine an operating mode for the AC asynchronous three-phase motor based on the slip rate obtained in step 201, in other words, it may determine whether the AC asynchronous three-phase motor needs to switch between two operating modes based on the slip rate.

Figure 4:
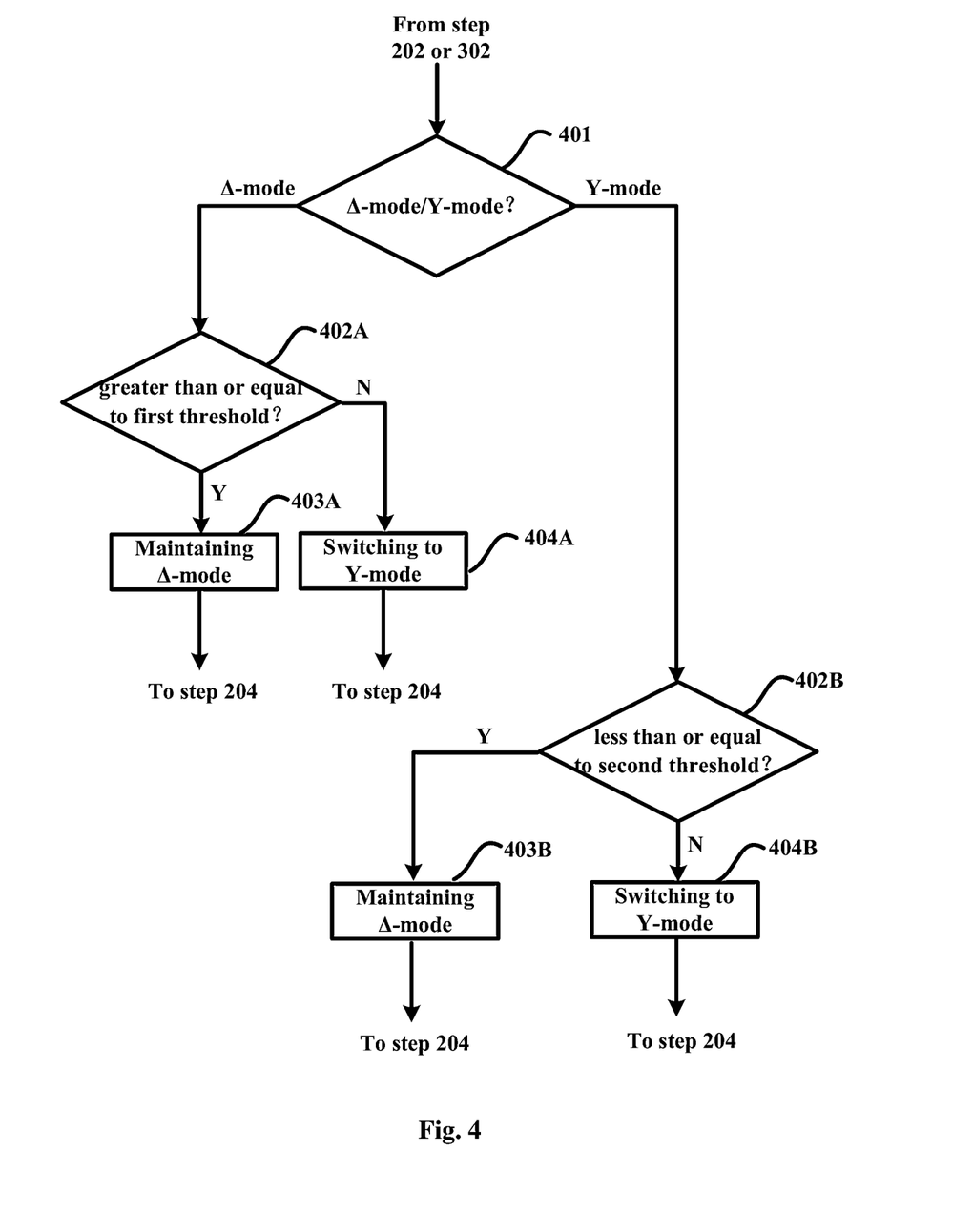
FIG. 4 is a flowchart of a method for determining operating modes of an AC asynchronous three-phase motor in accordance with some embodiments of the present application.

Exemplarily, the operating mode can be determined using the method shown in FIG. 4. Specifically, the method shown in FIG. 4 includes the following steps:

Step 401: the escalator controller or computing device determines in which operating mode the AC asynchronous three-phase motor is currently operating. If it operates in A-mode, proceed to step 402A, and if it operates in Y-mode, proceed to step 402B.

Two branch steps A and B in FIG. 4 are described below, respectively. Branch Step A Step 402A: the escalator controller or computing device determines whether the slip rate S is greater than or equal to the first threshold TH1. If it is greater than or equal to the first threshold, proceed to step 403A, otherwise proceed to step 404A. Step 403A: determining that the current operating mode continues to be A-mode. Step 404A: determining that the current operating mode switches from A-mode to Y-mode. Branch Step B Step 402B: the escalator controller or computing device determines whether the slip rate S is less than or equal to the second threshold TH2. If it is less than or equal to the second threshold, proceed to step 403B, otherwise proceed to step 404B. Step 403B: determining that the current operating mode continues to be Y-mode. Step 404B: determining that the current operating mode switches from Y-mode to A-mode.

After completing step 203, the method flow shown in FIG. 2 proceeds to step 204. In this step, the escalator controller or computing device generates a control command to operate the AC asynchronous three-phase motor in the operating mode determined in step 203.

Figure 5:
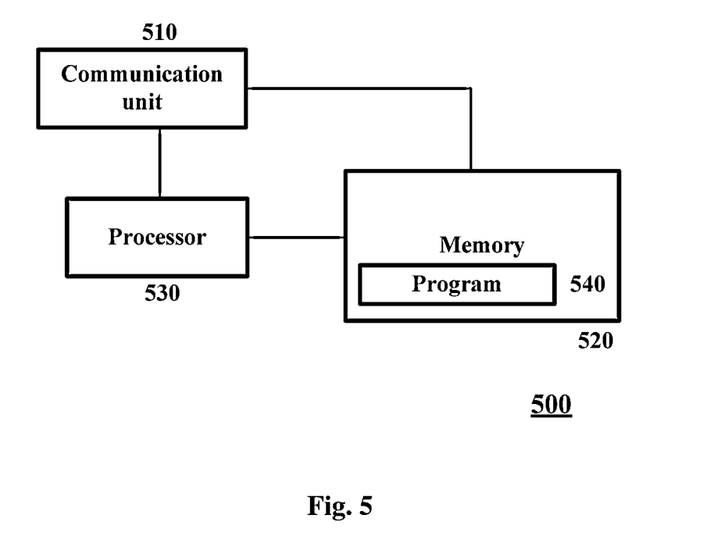
FIG. 5 is a schematic block diagram of a typical escalator controller or computing device.

FIG. 5 is a schematic block diagram of a typical escalator controller or computing device. The escalator controller or computing device shown in FIG. 5 may be used to implement the method shown in FIG. 2 for determining operating modes of an AC asynchronous three-phase motor in an escalator system.

As shown in FIG. 5, an escalator controller or computing device 500 contains a communication unit 510, a memory 520 (e.g., non-volatile memory such as flash memory, ROM, hard disk drive, magnetic disk, optical disc), a processor 530, and a computer program 540.

The communication unit 510 serves as a communication interface configured to establish a communication connection between the escalator controller or computing device and an external device (e.g., a measuring unit of the rotational speed of the motor) or a network (e.g., the Internet).

The memory 520 stores the computer program 540 executable by the processor 530. In addition, the memory 520 may store data generated by the processor 530 during execution of the computer program and data received from the external device via the communication unit 510 (e.g., a measured value of the rotational speed of the motor).

The processor 530 is configured to run the computer program 540 stored on the memory 520 and to access data on the memory 520 (e.g., to recall data received from the external device and to store calculations, such as a slip rate, in the memory 520).

The computer program 540 may include computer instructions for implementing the method described with the help of FIG. 4, so that the corresponding method can be implemented when the computer program 540 is run on the processor 530.

Figure 6:
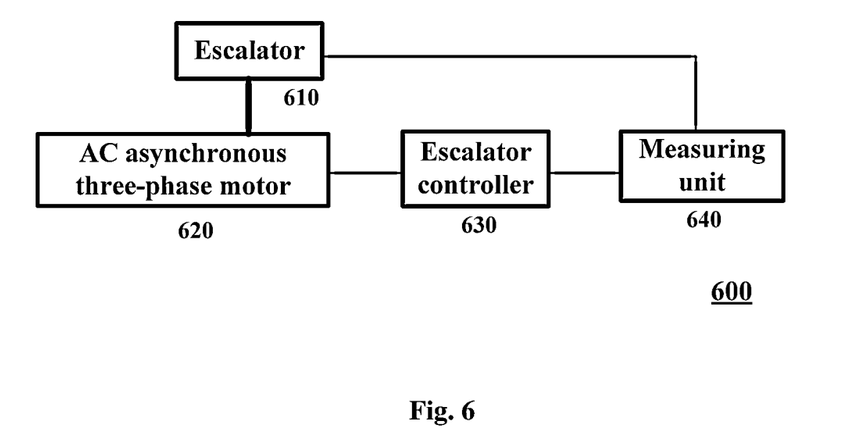
FIG. 6 is a schematic block diagram of a typical escalator system.

FIG. 6 is a schematic block diagram of a typical escalator system.

An escalator system 600 shown in FIG. 6 includes an escalator 610, an AC asynchronous three-phase motor 620 for driving the escalator, an escalator controller 630, and a measuring unit 640.

The AC asynchronous three-phase motor 620 may operate in a first operating mode (A-mode) and a second operating mode (Y-mode). The escalator controller 630 may have various features of the device shown in FIG. 5, which may be configured to implement the method shown in FIG. 2 for determining operating modes of an AC asynchronous three-phase motor in an escalator system.

For existing escalator controller, the above operating mode switching logic can be implemented simply by upgrading the control software running therein, which is advantageous for reducing costs and system development time.

According to another aspect of the present application, there is also provided a computer-readable storage medium on which a computer program is stored. When the program is executed by the processor, one or more steps contained in the method described above with the help of FIGS. 2-4 may be realized.

The computer-readable storage medium referred to in the application includes various types of computer storage media, and may be any available medium that may be accessed by a general-purpose or special-purpose computer. For example, the computer-readable storage medium may include RAM, ROM, EPROM, E2PROM, registers, hard disks, removable disks, CD-ROM or other optical disk storage, magnetic disk storage or other magnetic storage devices, or any other transitory or non-transitory medium that may be used to carry or store a desired program code unit in the form of instructions or data structures and that may be accessed by a general-purpose or special-purpose computer or a general-purpose or special-purpose processor. The above combination should also be included in the protection scope of the computer-readable storage medium. An exemplary storage medium is coupled to the processor such that the processor can read and write information from and to the storage medium. In the alternative, the storage medium may be integrated into the processor. The processor and the storage medium may reside in the ASIC. The ASIC may reside in the user terminal. In the alternative, the processor and the storage medium may reside as discrete components in the user terminal.

Those skilled in the art will appreciate that the various illustrative logical blocks, modules, circuits, and algorithm steps described herein may be implemented as electronic hardware, computer software, or combinations of both.

To demonstrate this interchangeability between hardware and software, various illustrative components, blocks, modules, circuits, and steps have been described above generally in terms of their functionality. Whether such functionality is implemented in hardware or software depends on the particular application and design constraints imposed on the overall system. Those skilled in the art may implement the described functionality in changing ways for the particular application. However, such implementation decisions should not be interpreted as causing a departure from the scope of the present application.

Although only a few of the specific embodiments of the present application have been described, those skilled in the art will recognize that the present application may be embodied in many other forms without departing from the spirit and scope thereof. Accordingly, the examples and implementations shown are to be regarded as illustrative and not restrictive, and various modifications and substitutions may be covered by the application without departing from the spirit and scope of the application as defined by the appended claims.

The embodiments and examples presented herein are provided to best illustrate embodiments in accordance with the present technology and its particular application, and to thereby enable those skilled in the art to implement and use the present application. However, those skilled in the art will appreciate that the above description and examples are provided for convenience of illustration and example only. The presented description is not intended to cover every aspect of the application or to limit the application to the precise form disclosed.

What is claimed is:

1. A device for determining operating modes of an AC asynchronous three-phase motor in an escalator system, wherein the operating modes comprise a first operating mode and a second operating mode, the AC asynchronous three-phase motor adopts a triangular wiring mode and a star wiring mode in the first operating mode and the second operating mode, respectively, the device comprising:
    a memory;
    a processor coupled with the memory; and
    a computer program stored on the memory and running on the processor, the running of the computer program causes:
    A. obtaining a slip rate of the AC asynchronous three-phase motor; and
    B. determining whether the AC asynchronous three-phase motor needs to be switched between the first operating mode and the second operating mode based on the slip rate.

2. The device of claim 1, wherein the device is an escalator controller or a computing device independent of the escalator controller.

3. The device of claim 1, wherein the running of the computer program further causes:
    C. generating a control command to cause the AC asynchronous three-phase motor to operate in the determined operating mode.

4. The device of claim 1, wherein the running of the computer program causes operation A to be performed in the following manner;
    A1. obtaining a measured value of a rotational speed of the AC asynchronous three-phase motor;
    A2. determining the slip rate by the following equation:

$$S = \frac{n_1 - n}{n_1}$$

Here, $n_1$ is a rotating magnetic field speed of the AC asynchronous three-phase motor, and n is the measured value of the rotational speed of the AC asynchronous three-phase motor.

5. The device of claim 1, wherein the running of the computer program causes operation B to be performed in the following manner;
    B1. when the AC asynchronous three-phase motor operates in the first operating mode, determining that a current operating mode continues to be the first operating mode if the slip rate is greater than or equal to a first threshold, otherwise switching the current operating mode to the second operating mode;
    B2. when the AC asynchronous three-phase motor operates in the second operating mode, determining that the current operating mode continues to be the second operating mode if the slip rate is less than or equal to a second threshold, otherwise switching the current operating mode to the first operating mode.

6. The device of claim 5, wherein the first threshold is greater than, equal to or less than the second threshold.

7. The device of claim 5, wherein the first threshold is taken in a range of −0.036 to 0.036, and the second threshold is taken in a range of −0.048 to 0.048.

8. An escalator system comprising:
an escalator;
an AC asynchronous three-phase motor for driving the escalator adapted to operate in a first operating mode and a second operating mode, wherein the AC asynchronous three-phase motor adopts a triangular wiring mode and a star wiring mode in the first operating mode and the second operating mode, respectively;
an escalator controller, comprising:
a memory;
a processor coupled with the memory; and
a computer program stored on the memory and running on the processor, the running of the computer program causes:
A. obtaining a slip rate of the AC asynchronous three-phase motor; and
B. determining whether the AC asynchronous three-phase motor needs to be switched between the first operating mode and the second operating mode based on the slip rate.

9. The escalator system of claim 8, wherein the running of the computer program further causes:
C. generating a control command to cause the AC asynchronous three-phase motor to operate in the determined operating mode.

10. The escalator system of claim 8, wherein further comprising a measuring unit configured to measure a rotational speed of the AC asynchronous three-phase motor and output the measured value to the escalator controller.

11. The escalator system of claim 10, wherein the running of the computer program causes operation A to be performed in the following manner;
A1. receiving from the measuring unit a measured value of the rotational speed of the AC asynchronous three-phase motor;
A2. determining the slip rate by the following equation:

$$S = \frac{n_1 - n}{n_1}$$

Here, $n_1$ is a rotating magnetic field speed of the AC asynchronous three-phase motor, and n is the measured value of the rotational speed of the AC asynchronous three-phase motor.

12. The escalator system of claim 8, wherein the running of the computer program causes operation B to be performed in the following manner;
B1. when the AC asynchronous three-phase motor operates in the first operating mode, determining that a current operating mode continues to be the first operating mode if the slip rate is greater than or equal to a first threshold, otherwise switching the current operating mode to the second operating mode;
B2. when the AC asynchronous three-phase motor operates in the second operating mode, determining that the current operating mode continues to be the second operating mode if the slip rate is less than or equal to a second threshold, otherwise switching the current operating mode to the first operating mode.

13. The escalator system of claim 12, wherein the first threshold is greater than, equal to or less than the second threshold.

14. The escalator system of claim 12, wherein the first threshold is taken in a range of −0.036 to 0.036, and the second threshold is taken in a range of −0.048 to 0.048.

15. The escalator system of claim 8, wherein the escalator is an automatic escalator or an automatic walkway.

16. A method for determining operating modes of an AC asynchronous three-phase motor in an escalator system, wherein the operating modes comprise a first operating mode and a second operating mode, the AC asynchronous three-phase motor adopts a triangular wiring mode and a star wiring mode in the first operating mode and the second operating mode, respectively, the method comprising:
A. obtaining a slip rate of the AC asynchronous three-phase motor; and
B. determining whether the AC asynchronous three-phase motor needs to be switched between the first operating mode and the second operating mode based on the slip rate.

17. The method of claim 16, wherein the method further comprises:
C. generating a control command to cause the AC asynchronous three-phase motor to operate in the determined operating mode.

18. The method of claim 16, wherein step A comprises:
A1. obtaining a measured value of a rotational speed of the AC asynchronous three-phase motor;
A2. determining the slip rate by the following equation:

$$S = \frac{n_1 - n}{n_1}$$

Here, $n_1$ is a rotating magnetic field speed of the AC asynchronous three-phase motor, and n is the measured value of the rotational speed of the AC asynchronous three-phase motor.

19. The method of claim 16, wherein step B comprises:
B1. when the AC asynchronous three-phase motor operates in the first operating mode, determining that a current operating mode continues to be the first operating mode if the slip rate is greater than or equal to a first threshold, otherwise switching the current operating mode to the second operating mode;
B2. when the AC asynchronous three-phase motor operates in the second operating mode, determining that the current operating mode continues to be the second operating mode if the slip rate is less than or equal to a second threshold, otherwise switching the current operating mode to the first operating mode.

20. The method of claim 19, wherein the first threshold is greater than, equal to or less than the second threshold.

21. The method of claim 19, wherein the first threshold is taken in a range of −0.036 to 0.036, and the second threshold is taken in a range of −0.048 to 0.048.

22. A computer-readable storage medium having instructions stored in the computer-readable storage medium, when the instructions are executed by a processor, the processor is caused to execute the method of claim 16.

* * * * *